(12) United States Patent
Finch et al.

(10) Patent No.: US 11,132,826 B2
(45) Date of Patent: Sep. 28, 2021

(54) ARTIFICIAL IMAGE GENERATION FOR TRAINING AN OBJECT DETECTION SYSTEM

(71) Applicant: Caterpillar Inc., Deerfield, IL (US)

(72) Inventors: Nolan Finch, Chicago, IL (US); Zachary Smith, Chicago, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/413,794

(22) Filed: May 16, 2019

(65) Prior Publication Data

US 2020/0364920 A1 Nov. 19, 2020

(51) Int. Cl.
| | |
|---|---|
| *G06T 7/70* | (2017.01) |
| *G06K 9/62* | (2006.01) |
| *G06T 17/05* | (2011.01) |
| *G06T 15/00* | (2011.01) |
| *G06K 9/00* | (2006.01) |

(52) U.S. Cl.
CPC .......... *G06T 15/00* (2013.01); *G06K 9/00791* (2013.01); *G06K 9/6256* (2013.01); *G06T 7/70* (2017.01); *G06K 9/62* (2013.01); *G06T 17/05* (2013.01); *G06T 2207/30252* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 8,811,663 | B2 | 8/2014 | Brown et al. |
| 9,158,995 | B2 | 10/2015 | Rodriguez-Serrano et al. |
| 9,213,892 | B2 | 12/2015 | Heisele |
| 10,289,935 | B2 | 5/2019 | Zia et al. |
| 10,664,722 | B1 * | 5/2020 | Sharma ................ G06K 9/6256 |

(Continued)

FOREIGN PATENT DOCUMENTS

WO 2018020954 A1 2/2018

OTHER PUBLICATIONS

Vianney Loing et al.: "Virtual Training for a Real Application: Accurate Object-Robot Relative Localization without Calibration", Arxiv.org, Cornell University Library, 201 Olin Library Cornell University Ithaca, Ny 14853, Feb. 7, 2019 (Feb. 7, 2019), XP081026522, DOI: 10.1007/S11263-01801102-6.

(Continued)

*Primary Examiner* — Matthew Salvucci
(74) *Attorney, Agent, or Firm* — Bookoff McAndrews (57) ABSTRACT

A device is disclosed. The device may obtain a machine model of a machine and associated motion data for the machine model of the machine. The device may render the machine model into a rendered environment associated with a set of characteristics. The device may capture a set of images of the machine model and the rendered environment based on rendering the machine model into the rendered environment. The device may determine bounding box data for the set of images of the machine model and the rendered environment based on the position of the machine model within the rendered environment relative to an image capture orientation within the rendered environment. The device may provide the set of images of the machine model and the rendered environment and the bounding box data as a data set for object detection.

20 Claims, 6 Drawing Sheets

(56) References Cited

U.S. PATENT DOCUMENTS

| | | |
|---|---|---|
| 2018/0253869 A1 | 9/2018 | Yumer et al. |
| 2018/0260651 A1 | 9/2018 | Wang et al. |
| 2018/0349741 A1 | 12/2018 | Yasutomi et al. |
| 2020/0202175 A1* | 6/2020 | Hieida .................... G06T 17/05 |

OTHER PUBLICATIONS

Tsung-Yi Lin et al.: "Microsoft COCO: Common Objects in Context" In: "Robo Cup 2008: RoboCup 2009: Robot Soccer World Cup XII", Jan. 1, 2014 (Jan. 1, 2014), Springer International Publishing, Cham 032682, XP055594044, ISBN: 978-3-319-10403-4 vol. 8693, pp. 740-755, DOI: 10.1007/978-3-319-10602-1_48, figure 1 p. 6-7.

Tarang Shah: "About Train, Validation and Test Sets in Machine Learning", Dec. 6, 2017 (Dec. 6, 2017), XP055595668, Retrieved from the internet: URL: https://towardsdatascience.com/trai-validation-and-test-sets-72cb40cba9e7 (retrieved on Jun. 11, 2019) the whole document.

Gaidon Adrien et al: "VirtualWorlds as Proxy for Multi-object Tracking Analysis", 2016 IEEE Conference on Computer Vision and Pattern Recognition (CVPR), IEEE, Jun. 27, 2016 (Jun. 27, 2016), pp. 4340-4349, XP033021620, DOI: 10.1109/CVPR. 2016. 470 [retrieved on Dec. 9, 2016] Section 3; pp. 3-4.

International Search Report dated Jul. 24, 2020 in International Patent Application No. PCT/US2020/030188 (4 pages, in English).

\* cited by examiner

ARTIFICIAL IMAGE GENERATION FOR TRAINING AN OBJECT DETECTION SYSTEM

TECHNICAL FIELD

The present disclosure relates generally to artificial image generation and to artificial image generation for training an object detection system.

BACKGROUND

Image processing may include image classification techniques and object detection techniques. An image classification system may analyze a particular image and provide information identifying a likelihood that a particular class of object is included in the particular image. For example, an image classification system may provide information indicating that there is a first probability that a first class of object is depicted somewhere in the particular image, a second probability that a second class of object is depicted somewhere in the particular image, and/or the like.

In contrast, in object detection, an object detection system may analyze the particular image and provide information identifying a location of a particular class of object within the particular image. For example, the object detection system may provide information indicating that there is a threshold probability that the particular class of object is depicted in the particular image at one or more different locations within the image. In other words, the object detection system may detect a first instance of the particular class of object at a first location in the particular image and a second instance of the particular object at a second location in the particular image. In this case, the object detection system may provide, as output, information identifying one or more bounding boxes that represent areas in the image within which the particular class of object is detected with a threshold probability. Alternatively, the object detection system may provide pixel-level segmentation data, which may be a form of bounding box data. Pixel-level segmentation may refer to information identifying pixels of an image as depicting a particular class of object or not depicting a particular class of object, rather than using a box to define an area inside of which are pixels that depict the particular class of object. Alternatively, the object detection system may provide pixel-level bounding box data, whereby the bounding box represents a pixel-level outline of the particular class of object, rather than a rectilinear outline of the particular class of object.

Such an object detection system may be trained using a deep-learning technique, a convolutional neural network (CNN) technique, a computer-vision technique, and/or the like. However, acquiring images for training such an object detection system may be resource intensive. For example, training of an object detection system may use thousands, hundreds of thousands, or even millions of images of objects that are to be detected in images. Moreover, to ensure that the object detection system is trained to detect an object under a variety of conditions (e.g., environmental conditions, lighting conditions, and/or the like), many images may need to be acquired of the object under each of the variety of conditions.

One attempt to provide for automatic training data collection to train an object detector is disclosed in U.S. Pat. No. 8,811,633 that issued to Brown et al. on Aug. 19, 2014 ("the '663 patent"). In particular, the '663 patent discloses automatically collecting a set of training data images from a plurality of images and synthetically generating occluded images with at least one synthetically originated partial occlusion. However, while the system described in the '663 patent may automatically collect images and generate partially occluded images, such a process requires large amounts of time and resources. For example, collecting images of vehicles in traffic videos to obtain nearly one million images under a variety of illumination and weather conditions involved using 30 traffic surveillance cameras, which constantly captured data over a period of several months.

The artificial image generation for training an object detection system of the present disclosure solves one or more of the problems set forth above and/or other problems in the art.

SUMMARY

According to some implementations, a method may include obtaining, by a device, a machine model of a machine and associated motion data for the machine model of the machine; rendering, by the device, the machine model into a rendered environment associated with a set of characteristics; capturing, by the device, a set of images of the machine model and the rendered environment based on rendering the machine model into the rendered environment, wherein the set of images vary based on varying at least one of a position of the machine model based on the associated motion data or the set of characteristics; determining, by the device, bounding box data for the set of images of the machine model and the rendered environment based on the position of the machine model within the rendered environment relative to an image capture orientation within the rendered environment; and providing, by the device, the set of images of the machine model and the rendered environment and the bounding box data as a data set for object detection.

According to some implementations, a device may include one or more memories; and one or more processors, communicatively coupled to the one or more memories, configured to: one or more processors, communicatively coupled to the one or more memories, configured to: obtain a machine model of a machine and associated motion data for the machine model of the machine; render the machine model into a rendered environment associated with a set of characteristics; capture a set of images of the machine model and the rendered environment based on rendering the machine model into the rendered environment, wherein the set of images vary based on varying at least one of a position of the machine model based on the associated motion data or the set of characteristics; determine bounding box data for the set of images of the machine model and the rendered environment based on the position of the machine model within the rendered environment relative to an image capture orientation within the rendered environment; divide a data set of the bounding box data and the set of images into a training data set and a validation data set; train an object detection system to detect an object in imaging data based on a first subset of the set of images and a corresponding first subset of bounding box data of the training data set; validate the object detection system using a second subset of the set of images and a corresponding second subset of bounding box data of the validation data set; and provide the object detection system to perform object detection for the machine corresponding to the machine model of the machine.

According to some implementations, a non-transitory computer-readable medium may store one or more instructions. The one or more instructions, when executed by one or more processors of a device, may cause the one or more processors to: obtain a machine model of a machine and associated motion data for the machine model of the machine; render the machine model into a rendered environment associated with a set of characteristics; vary a position of the machine model with respect to the rendered environment based on the associated motion data; vary the set of characteristics; capture a set of images of the machine model and the rendered environment based on varying the position of the machine model and varying the set of characteristics; determine bounding box data for the set of images of the machine model and the rendered environment based on the position of the machine model within the rendered environment relative to an image capture orientation within the rendered environment; and provide the set of images of the machine model and the rendered environment and the bounding box data as a data set for object detection.

DETAILED DESCRIPTION

This disclosure relates to artificial image generation for training an object detection system. The artificial image generation has universal applicability to any machine utilizing such an object detection system. The term "machine" may refer to any machine that performs an operation associated with an industry such as, for example, mining, construction, farming, transportation, or any other industry. As some examples, the machine may be a vehicle, a backhoe loader, an excavator, an industrial loader, a motor grader, a skid steer loader, a tractor, a dozer, or other above ground equipment, underground equipment, or marine equipment. Moreover, one or more implements may be connected to the machine and driven and/or monitored by an object detection system trained using artificially generated images.

Figure 1:
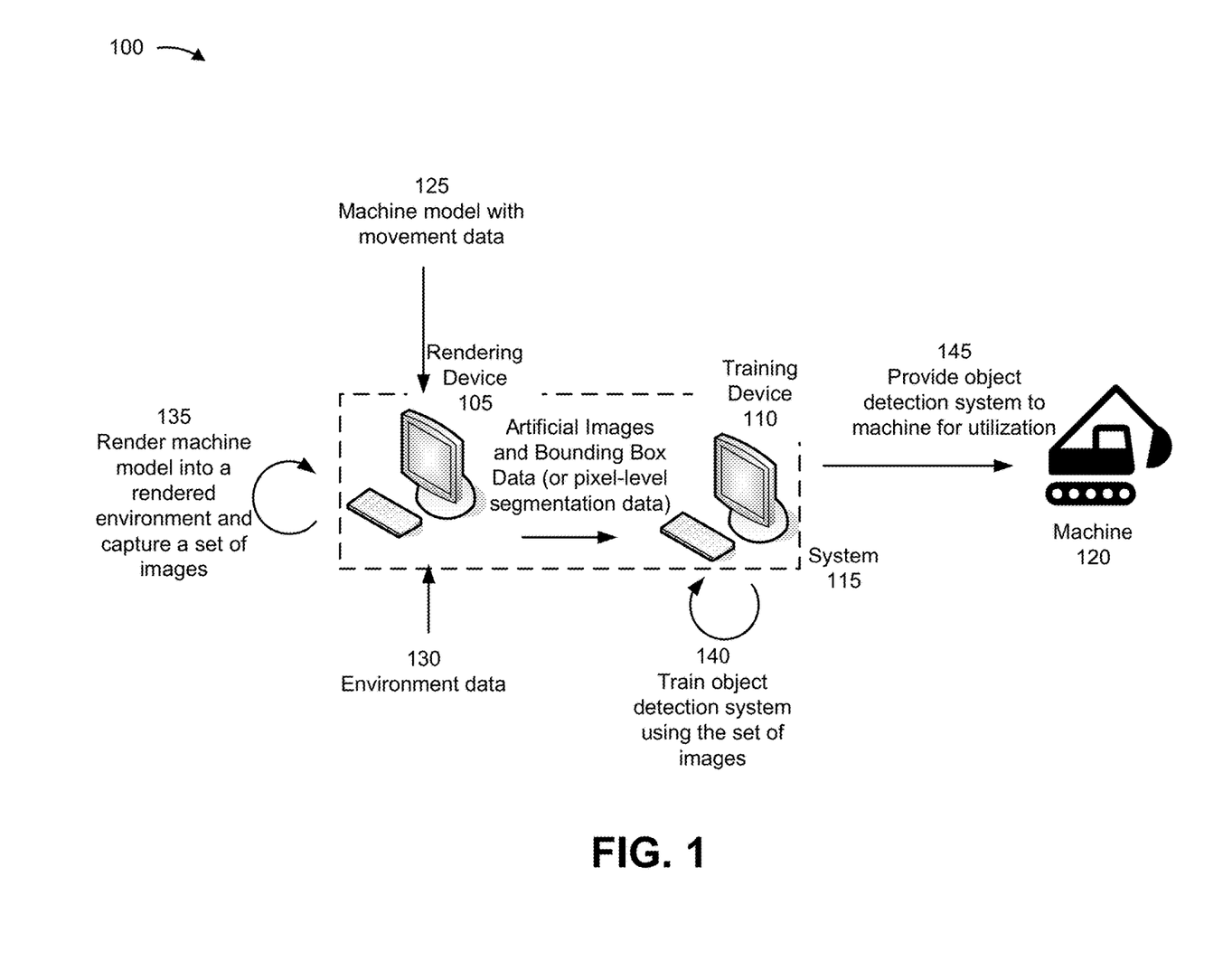
FIG. 1 is a diagram of an example artificial image generation for training an object detection system described herein.

FIG. 1 is a diagram of an example 100 of artificial image generation for training an object detection system described herein. As shown in FIG. 1, the example 100 includes a rendering device 105, a training device 110, a system 115, and a machine 120.

As further shown in FIG. 1, and by reference 125, the rendering device 105 may receive a machine model and associated movement data. For example, the rendering device 105 may be communicatively coupled to a data structure or another device (e.g., via a network) to receive data for rendering a three-dimensional representation of a machine. Further, the rendering device 105 may receive associated data for rendering movements of the machine model of the machine that correspond to physical movements of the machine. The data associated with the machine model may include data associated with altering a characteristic of the machine model when rendering the machine model. For example, the data may include data for rendering a machine wear condition of the machine model, such as for rendering a machine model corresponding to a new machine, a used machine, a rusted machine, a damaged machine, and/or the like. Additionally, or alternatively, the data associated with the machine model may include physics based motion data, self-labeled data, and/or the like.

As further shown in FIG. 1, and by reference 130, the rendering device 105 may receive environment data. For example, the rendering device 105 may be communicatively coupled to a data structure or another device (e.g., via a network) to receive information for rendering an environment into which to render the machine model. The environment data may be associated with a three-dimensional representation of an environment in which to render the machine model. Additionally, or alternatively, the environment data may be associated with a two-dimensional representation of the environment, such as a representation of a background in front of which to render the machine model. The environment data may be associated with one or more environments in which the machine is to be operated. For example, the environment data may be associated with rendering a forest environment, a mining environment, a construction environment, and/or the like.

The environment data may include information for altering characteristics of a rendered environment. For example, the environment data may include weather condition data, such as data for rendering a rain condition, a snow condition, and/or the like in connection with a rendering of an environment and a machine model. The environment data may include data for rendering a lighting condition, such as a natural lighting condition, an artificial lighting condition, and/or the like in connection with a rendering of an environment and a machine model.

As further shown in FIG. 1, and by reference 135, the rendering device 105 may render the machine model into a rendered environment and may capture a set of images. For example, the rendering device 105 may render a set of environments (e.g., a forest environment, a construction environment, a snow-covered environment, a raining environment, a morning environment, a sunset environment, an artificially lit environment, and/or the like), and may render the machine model into the rendered environment (e.g., a representation of a new version of the machine, a used version of the machine, and/or the like). In this case, the rendering device 105 may capture self-labeled synthetic images, such as of the machine model in the rendered environment, of a digital rendering of an object in the rendered environment (e.g., of a portion of the machine model, of another type of object, and/or the like), of the rendered environment without the machine model or an object, and/or the like.

The rendering device 105 may vary a position of the machine model within the rendered environment. For example, the rendering device 105 may use the associated motion data to move the machine model within the rendered environment and capture images of the machine model at differing positions and/or orientations within the rendered environment. The rendering device 105 may re-render another environment with a different set of characteristics. For example, the rendering device 105 may capture first images of the machine model in a rendered environment with first characteristics (e.g., a first lighting condition) and second images of the machine model in the rendered environment with second characteristics (e.g., a second lighting condition).

In this case, the rendering device 105 may capture a set of images based on rendering the machine model into the rendered environment. For example, the rendering device 105 may determine an orientation of a camera with respect to a machine (e.g., a camera used for an object detection system of the machine), and may capture photo-realistic images of the machine model and the rendered environment with an orientation matching the orientation of the camera. The rendering device 105 may determine the orientation of the camera based on data associated with the machine model. The rendering device 105 may capture hundreds, thousands, or millions of images with different characteristics (e.g., different weather conditions, lighting conditions, wear conditions, and/or the like).

The rendering device 105 may alter one or more captured images based on an alteration characteristic to generate an altered image for inclusion in a data set for training an object detection system. For example, the rendering device 105 may apply one or more post-capture alterations using image processing techniques. The one or more post-capture alterations may include alterations to a weather condition (e.g., superimposing rain into the image), a lighting condition (e.g., altering a brightness of a portion of the image), a visibility condition (e.g., partially obscuring a portion of the image), a resolution characteristic of the image, an obstruction condition (e.g., a first object may be superimposed into the image to obstruct a portion of a second object that is to be detected), a background condition (e.g., one or more objects may be superimposed into a background of the image), and/or the like. In this way, the rendering device 105 may account for differing conditions that may be observed by an object detection system of the machine, such as a weather condition, a lack of visibility (e.g., a smudge on a lens of a camera, fog obscuring a portion of a construction site, and/or the like), and/or the like.

The rendering device 105 may generate bounding box data or pixel-level segmentation data for the set of captured images. A bounding box may represent a portion of an image in which an object for recognition occurs. For example, the rendering device 105 may determine a position of, for example, a bucket of a machine model in a rendering of the machine model in a rendered environment using position data associated with the machine model. In this case, the rendering device 105 may determine a location of the bucket, within an image captured of the machine model, and may determine a bounding box for the image representing a box within which pixels showing the bucket occur. Although some implementations are described in terms of bounding box data representing a set of pixels bounding an object for detection, the bounding box data may include pixel-level segmentation whereby pixels are labeled as corresponding to an object for detection (e.g., the bucket of the machine model) or not corresponding to the object for detection; a pixel-level outline of the object for detection; or another type of bounding box data associated with enabling training of an object detection system.

The rendering device 105 may store scene metadata associated with the set of captured images. For example, the rendering device 105 may store scene metadata identifying characteristics of the rendered environment of an image, a position of a bounding box with respect to the image, and/or the like for use in training an object detection system.

As further shown in FIG. 1, and by reference 140, the rendering device 105 may provide generated artificial images and bounding box data (or pixel-level segmentation data) to training device 110, and training device 110 (or rendering device 105 or system 115) may train an object detection system using the set of images. For example, the training device 110 may train the object detection system to detect a particular object in connection with a machine using the set of images of the machine model in the rendered environment. In some implementations, training device 110 and rendering device 105 may be separate devices of, for example, a common system 115, as shown. Alternatively, training device 110 and rendering device 105 may be implemented in a single device or group of devices.

The particular object may be a portion of the machine (e.g., a bucket implement, a set of bucket teeth, and/or the like), a characteristic of a portion of the machine (e.g., whether a bucket implement is filled with dirt, a wear condition of a set of bucket teeth), an object in proximity to the machine (e.g., a road sign, a person, a tree, and/or the like), and/or the like. The training device 110 may use a deep learning technique, a convolutional neural network technique, an artificial intelligence technique, a computer vision technique, and/or the like to train the object detection system. The training device 110 may use scene metadata, such as information indicating that a particular type of object is in an image, information indicating a characteristic of a rendered environment of the image, and/or the like to train the object detection system.

The training device 110 may divide the set of images into multiple groups to train the object detection system. For example, the training device 110 may divide the set of images into a training data set and a validation data set. In this case, the training device 110 may train the object detection system using the training data set and may validate that the object detection system detects objects with a threshold accuracy using the validation data set. When the object detection system fails to satisfy the threshold accuracy, the rendering device 105 may generate additional images of the machine model in the rendered environment and may retrain the object detection system (or train a new object detection system) using the additional images.

The training device 110 may use the bounding box data to train the object detection system. For example, the training device 110 may train the object detection system to draw a bounding box around a detected object, and may compare a first bounding box drawn by the object detection system based on an image to a second bounding box generated based on location data of the machine model within a rendered environment. In this case, when the first bounding box is within a threshold proximity of the second bounding box, the training device 110 may determine that the object detection system correctly identified a location of the object or locations of the objects within the image.

As further shown in FIG. 1, and by reference 145, the training device 110 may provide the object detection system to the machine 120 for utilization in performing object detection using, for example, an imaging system of the machine 120.

As indicated above, FIG. 1 is provided as an example. Other examples may differ from what was described in connection with FIG. 1.

Figure 2:
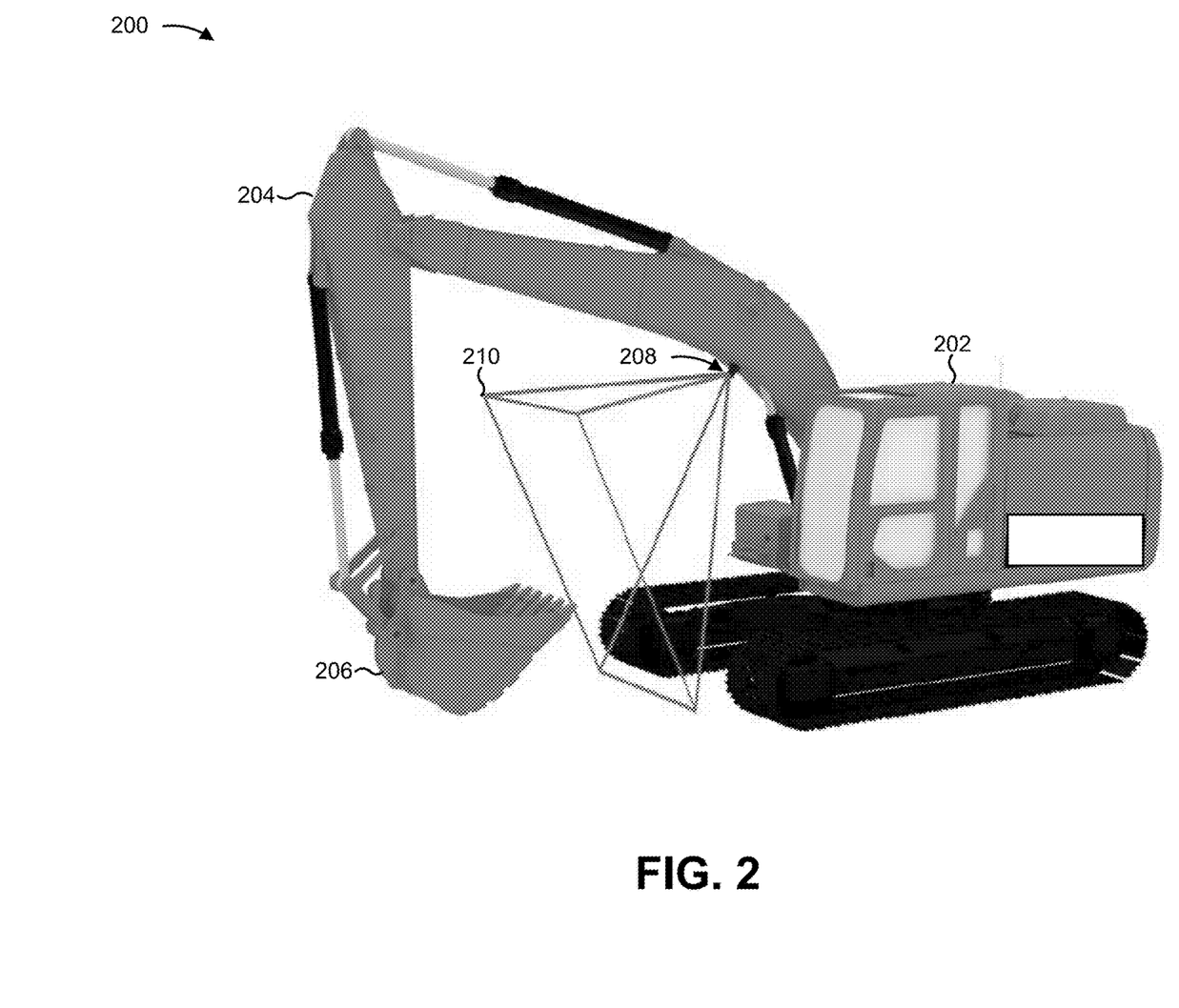
FIG. 2 is a diagram of an example machine model used for artificial image generation described herein.

FIG. 2 is a diagram of an example 200 of a machine model 202 used for artificial image generation described herein. As shown in FIG. 2, the machine model 202 may include an implement 204. The implement 204 may articulate a bucket 206. The machine model 202 may further include a camera 208 that is associated with a field-of-view shown by frustum projection 210. Data of the machine model 202 may identify a position of the bucket 206 with respect to the camera 208 and the frustum projection 210 at each possible articulation position of the implement 204. In this way, the rendering device 105 may determine a location of a bounding box surrounding the bucket 206 in a two-dimensional captured image of the machine model 202 in a rendered environment. For example, the bounding box may represent a portion of the frustum projection 210 that is aligned to the bucket 206. In this case, the captured image may be a rendering of an image captured from a position of the camera 208 and with an orientation corresponding to the frustum projection 210.

As indicated above, FIG. 2 is provided as an example. Other examples may differ from what was described in connection with FIG. 2.

Figure 3:
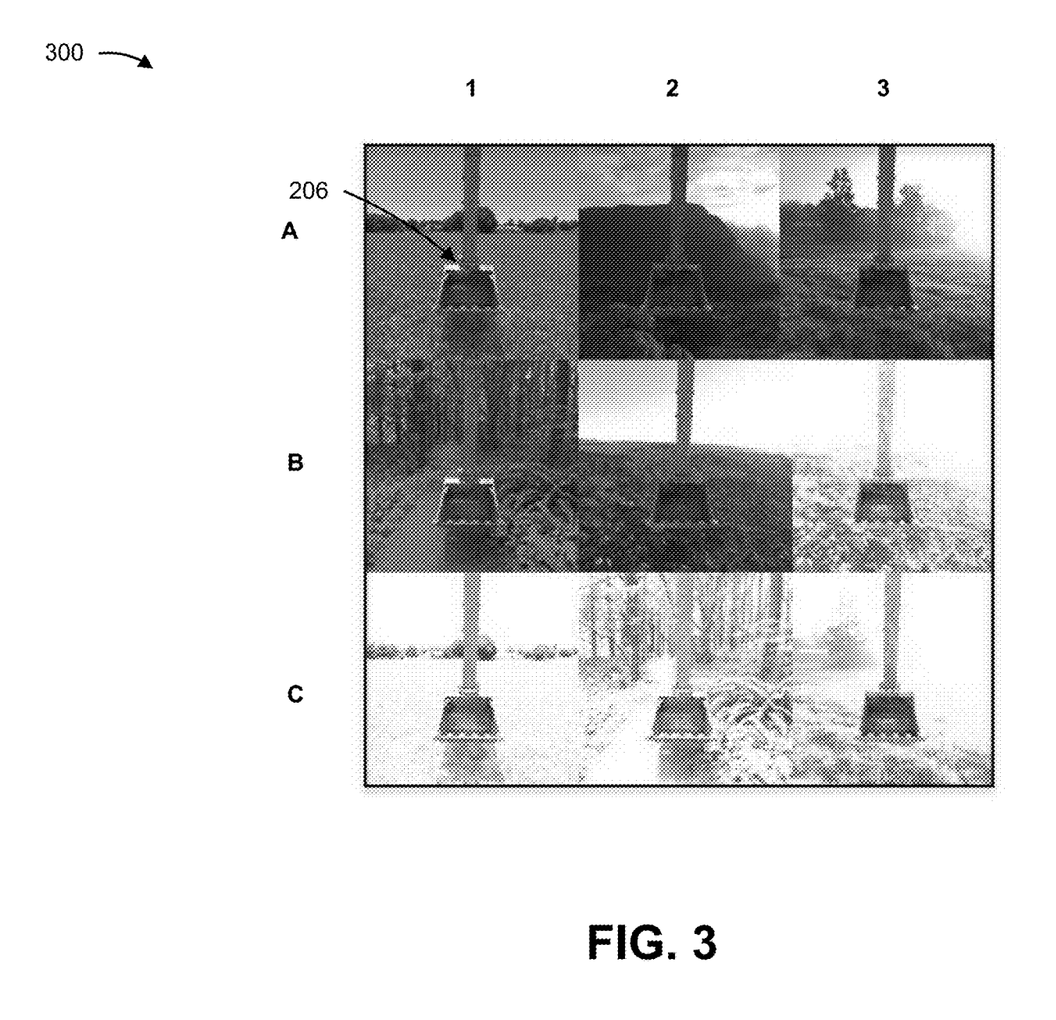
FIG. 3 is a diagram of images captured of the example machine model rendered into a rendered environment described herein.

FIG. 3 is a diagram of an example 300 of images A1-C3 captured of a machine model rendered into a rendered environment described herein. For example, image A1 is of the machine model (e.g., of the bucket 206) in a grassy rendered environment with a neutral lighting condition. Similarly, image A3 is of the machine model in the same grass rendered environment but with a bright lighting condition. As another example, image B1 is of the machine model in a forested rendered environment with a relatively dark lighting condition. Similarly, image C2 is of the machine model in the forested rendered environment but with a relatively bright lighting condition. As another example, images B2 and B3 show the machine model in another grassy rendered environment with a neutral lighting condition and a bright lighting condition, respectively. As another example, images A3 and C3 show the machine model in a grassy environment with a building in the background and with differing levels of brightness. Finally, as another example, image A2 shows the machine model in a rocky environment with a relatively dark lighting condition. Further, in each of images A1-C3, the machine model is shown with a relatively high level of wear (e.g., rust on the machine model).

As indicated above, FIG. 3 is provided as an example. Other examples may differ from what was described in connection with FIG. 3.

Figure 4:
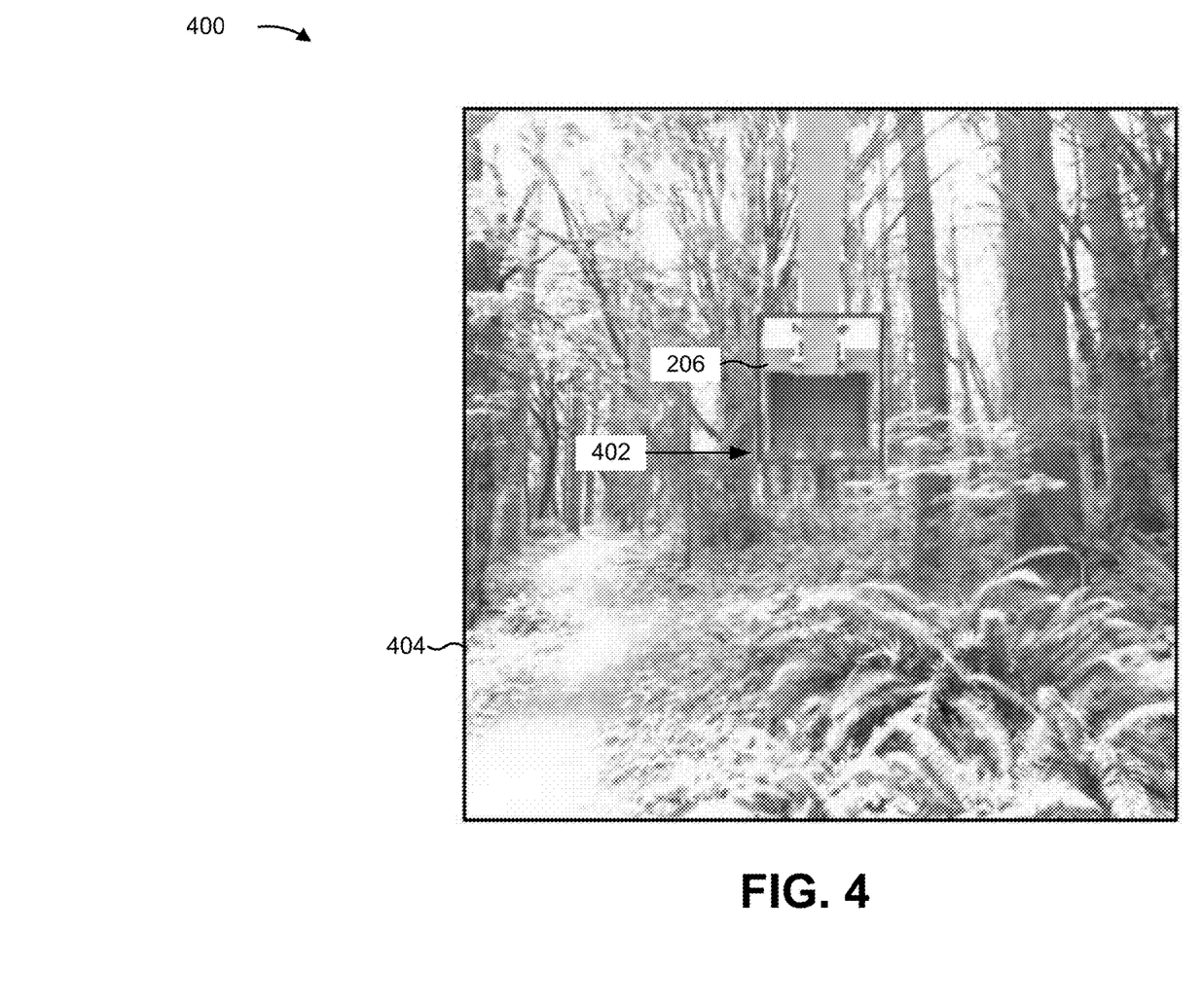
FIG. 4 is a diagram of example bounding box data for training an object detection system described herein.

FIG. 4 is a diagram of an example 400 of bounding box data for training an object detection system described herein. As shown in FIG. 4, a bounding box 402 may be a subset of image 404 that surrounds an object that is to be detected (e.g., the bucket 206). In this case, the rendering device 105 may determine the bounding box 402 based on positioning information identifying a position of the bucket 206 relative to a position of an image capture device of a machine represented by a machine model. In other words, based on the machine model, the rendering device 105 may determine a location for the bounding box 402 based on where the bucket 206 is in relation to the camera 208 and the frustum projection 210. In this way, when the rendering device 105 captures an image from a simulated perspective of the camera 208, the rendering device 105 accurately generates the bounding box 402 for use in training an object detection system.

As indicated above, FIG. 4 is provided as an example. Other examples may differ from what was described in connection with FIG. 4.

Figure 5:
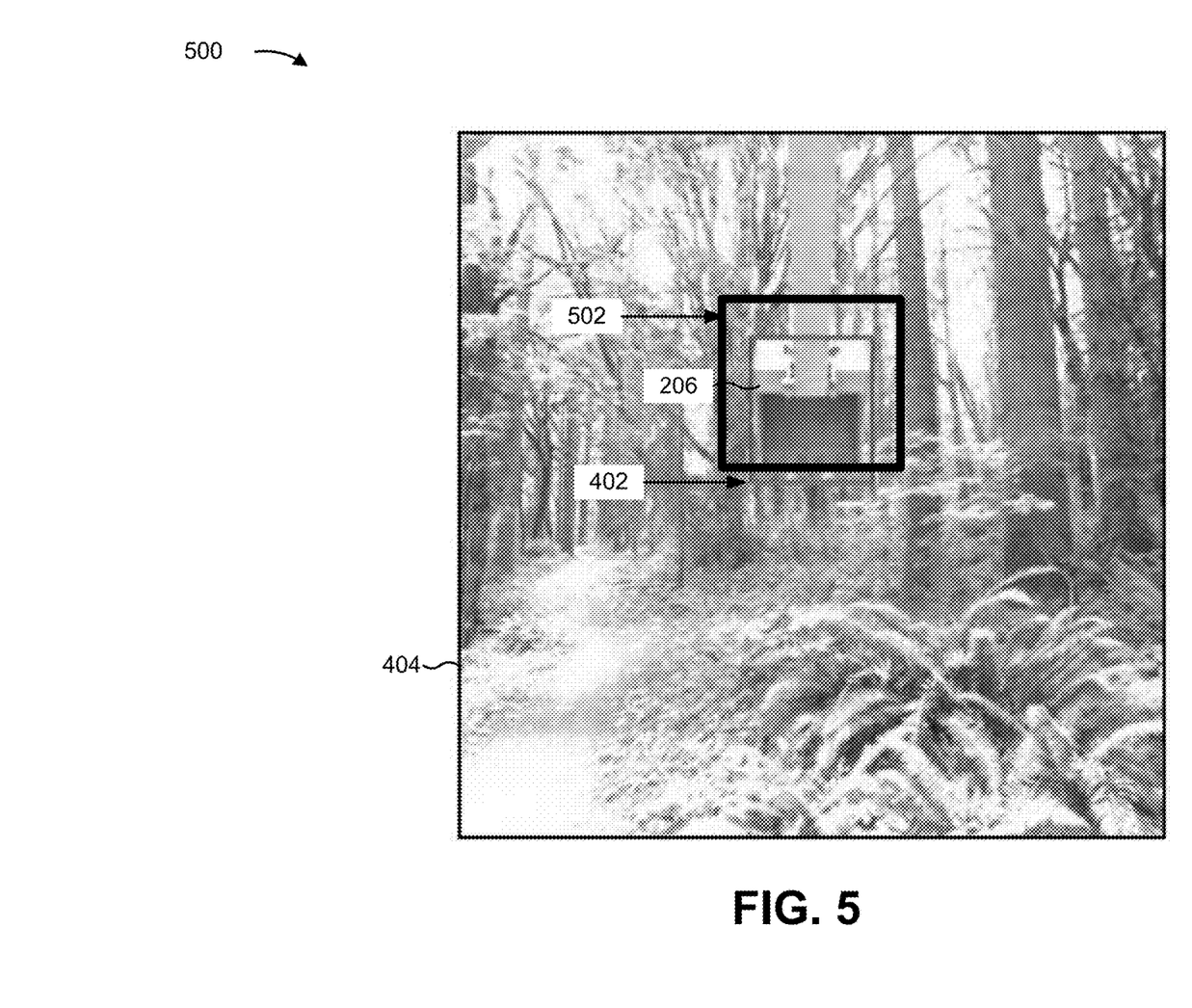
FIG. 5 is a diagram of training an object detection system using an artificially generated image and bounding box data described herein.

FIG. 5 is a diagram of an example 500 of training an object detection system using an artificially generated image and bounding box data described herein. As shown in FIG. 5, during training of the object detection system, the training device 110 may determine a bounding box 502 for the bucket 206 based on analyzing the image 404 (e.g., without using information regarding the machine model to determine the bounding box 502). In this case, the training device 110 may compare the bounding box 502 to a bounding box 402 determined by rendering device 105 based on positioning data of the bucket 206 relative to an orientation of the image 404. The training device 110 may determine whether the bounding box 502 is within a threshold proximity of the bounding box 402 to determine whether the object detection system is identifying a location of the bucket 206 in the image 404 with a threshold accuracy.

As indicated above, FIG. 5 is provided as an example. Other examples may differ from what was described in connection with FIG. 5.

Figure 6:
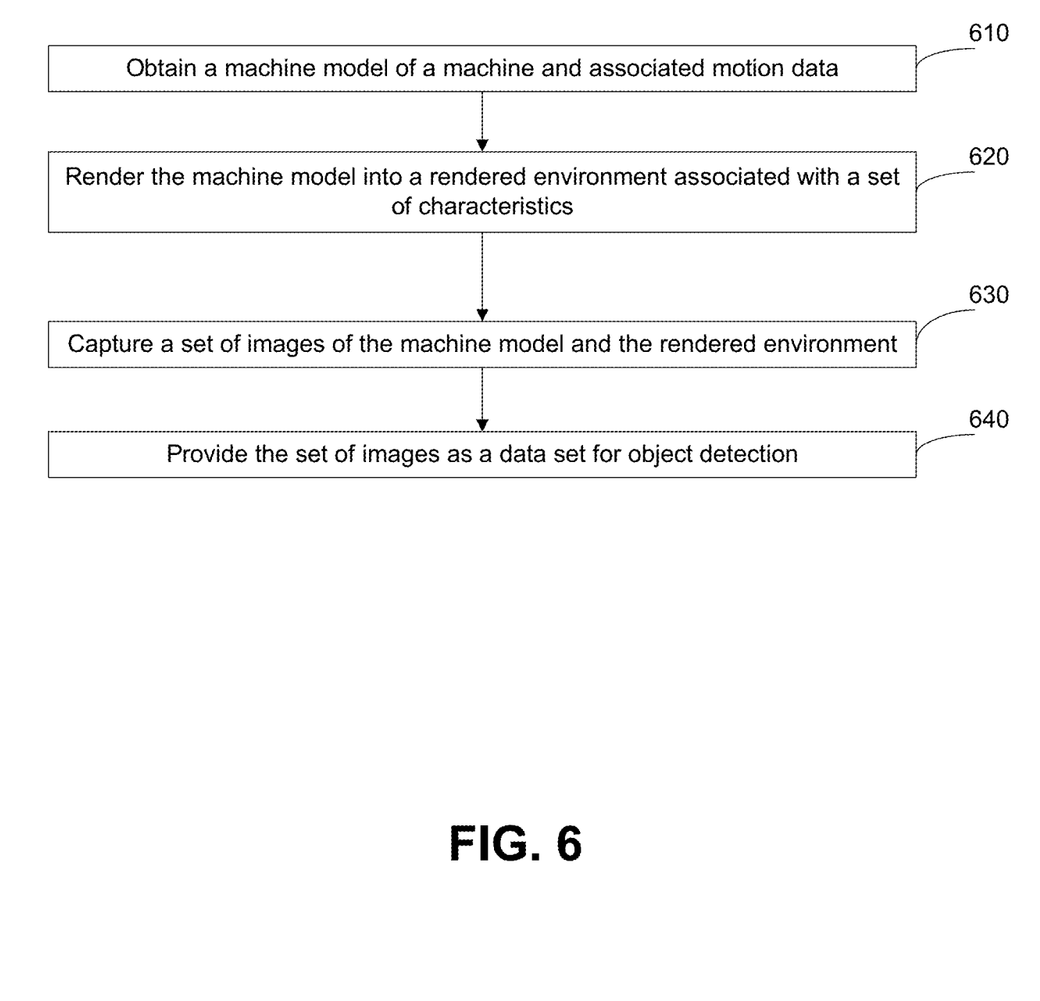
FIG. 6 is a flow chart of an example process for artificial image generation for training an object detection system.

FIG. 6 is a flow chart of an example process 600 for artificial image generation for training an object detection system. One or more process blocks of FIG. 6 may be performed by a device (e.g., the rendering device 105 or another device).

As shown in FIG. 6, process 600 may include obtaining a machine model of a machine and associated motion data (block 610). For example, the device may obtain a machine model of a machine and associated motion data for the machine model of the machine.

As further shown in FIG. 6, process 600 may include rendering the machine model into a rendered environment associated with a set of characteristics (block 620). For example, the device may render the machine model into a rendered environment associated with a set of characteristics.

As further shown in FIG. 6, process 600 may include capturing a set of images of the machine model and the rendered environment (block 630). For example, the device may capture a set of images of the machine model and the rendered environment based on rendering the machine model into the rendered environment and wherein the set of images vary based on varying at least one of a position of the machine model based on the associated motion data or the set of characteristics. In some implementations, the set of images vary based on varying at least one of a position of the machine model based on the associated motion data or the set of characteristics. The device may determine bounding box data for the set of images of the machine model and the rendered environment based on the position of the machine model within the rendered environment relative to an image capture orientation within the rendered environment.

As further shown in FIG. 6, process 600 may include providing the set of images as a data set for object detection (block 640). For example, the device may provide the set of images of the machine model and the rendered environment and the bounding box data as a data set for object detection.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

INDUSTRIAL APPLICABILITY

Artificial image generation may be used with any machine. The rendering device may render a machine model into a rendered environment and capture images of the machine model in the rendered environment to train an object detection system deployed on a machine. Several advantages may be associated with artificial image generation described herein. For example, by artificially generating images for training object detection, reduced resources may be expended to train object detection systems relative to manually capturing (and labeling bounding boxes for) thousands, hundreds of thousands, or millions of images of objects under differing conditions. Moreover, by artificially changing characteristics of the rendered environment, the machine model, or an artificial image, the rendering device enables training of the object detection system under conditions for which actual imaging may not be obtainable, such as for object detection of prototype machine implements, object detection under rare environmental or lighting conditions, and/or the like. Furthermore, a quantity of images that are used to train an object detection system may be increased by using artificial image generation, thereby increasing an accuracy of the object detection system relative to training the object detection system with a lesser quantity of real images.

As used herein, the articles "a" and "an" are intended to include one or more items, and may be used interchangeably with "one or more." Also, as used herein, the terms "has," "have," "having," and/or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
    generating, by a device, artificial images of a machine and an environment;
    obtaining, by the device, a synthetic machine model of the machine and associated motion data for the synthetic machine model of the machine based on the artificial images of the machine generated by the device;
    rendering, by the device, the synthetic machine model into a synthetic rendered environment associated with a set of characteristics based on the artificial images of the environment generated by the device;
    capturing, by the device, a set of images of the synthetic machine model and the synthetic rendered environment based on rendering the synthetic machine model into the synthetic rendered environment,
    wherein the set of images vary based on varying at least one of a position of the synthetic machine model based on the associated motion data or the set of characteristics;
    determining, by the device, bounding box data for the set of images of the synthetic machine model and the synthetic rendered environment based on the position of the synthetic machine model within the synthetic rendered environment relative to an image capture orientation within the synthetic rendered environment; and
    providing, by the device, the set of images of the synthetic machine model and the synthetic rendered environment and the bounding box data as a data set for object detection.

2. The method of claim 1, further comprising:
    dividing the data set into a training data set and a validation data set;
    training an object detection system to detect an object in imaging data based on a first subset of the set of images and a corresponding first subset of bounding box data of the training data set;
    validating the object detection system using a second subset of the set of images and a corresponding second subset of bounding box data of the validation data set; and
    providing the object detection system to perform object detection for the machine corresponding to the synthetic machine model of the machine.

3. The method of claim 1, further comprising:
    varying the position of the synthetic machine model with respect to the synthetic rendered environment based on the associated motion data; and
    wherein capturing the set of images comprises:
    capturing the set of images based on varying the position of the synthetic machine model in the synthetic rendered environment.

4. The method of claim 1, further comprising:
    varying the set of characteristics;
    re-rendering at least one of the rendered environment or the synthetic machine model based on varying the set of characteristics; and
    wherein capturing the set of images comprises:
    capturing the set of images based on re-rendering the at least one of the synthetic rendered environment or the synthetic machine model.

5. The method of claim 1, wherein the set of characteristics includes at least one of:
    a type of the synthetic rendered environment,
    a lighting condition of the synthetic rendered environment,
    a weather condition of the synthetic rendered environment,
    or a machine wear condition of the synthetic machine model.

6. The method of claim 1, wherein determining the bounding box data comprises:
    determining, for a particular image of the set of images, a position of a portion of the synthetic machine model for which object detection is to be performed with respect to the synthetic rendered environment based on data associated with the synthetic machine model; and
    determining, for the particular image, a position of a bounding box for the portion of the synthetic machine model based on the position of the portion of the synthetic machine model.

7. The method of claim 1, wherein prior to determining, by the device, the bounding box data, the method comprises:
    generating, by the device, a simulated perspective field-of-view of a camera positioned on the synthetic machine model to determine the image capture orientation.

8. The method of claim 1, wherein prior to providing, by the device, the set of images, the method comprises:
    drawing a virtual outline around a subset of the synthetic machine model or the synthetic rendered environment based on the bounding box data.

9. A device, comprising:
one or more memories; and
one or more processors, communicatively coupled to the one or more memories, configured to:
generate artificial image data of a machine and an environment;
obtain a synthetic machine model of the machine and associated motion data for the synthetic machine model of the machine based on the generated artificial image data of the machine;
render the synthetic machine model into a synthetic rendered environment associated with a set of characteristics based on the generated artificial image data of the environment;
capture a set of images of the synthetic machine model and the synthetic rendered environment based on rendering the synthetic machine model into the synthetic rendered environment,
wherein the set of images vary based on varying at least one of a position of the synthetic machine model based on the associated motion data or the set of characteristics;
determine bounding box data for the set of images of the synthetic machine model and the synthetic rendered environment based on the position of the synthetic machine model within the synthetic rendered environment relative to an image capture orientation within the synthetic rendered environment;
divide a data set of the bounding box data and the set of images into a training data set and a validation data set;
train an object detection system to detect an object in imaging data based on a first subset of the set of images and a corresponding first subset of bounding box data of the training data set;
validate the object detection system using a second subset of the set of images and a corresponding second subset of bounding box data of the validation data set; and
provide the object detection system to perform object detection for the machine corresponding to the synthetic machine model of the machine.

10. The device of claim 9, wherein the one or more processors are further configured to:
provide the object detection system for use on a particular machine corresponding to the synthetic machine model of the machine.

11. The device of claim 10, wherein an orientation of the set of images with respect to a digital rendering of the object for which detection is to be performed corresponds to an orientation of a camera for object detection on the particular machine relative to the object for which detection is to be performed.

12. The device of claim 11, wherein the object is an implement of the machine.

13. The device of claim 9, wherein the one or more processors are further configured to:
alter an image, of the set of images, based on an alteration characteristic to generate an altered image; and
store the altered image.

14. The device of claim 13, wherein the alteration characteristic is at least one of:
a lighting condition,
a weather condition,
a background condition,
a machine wear condition,
a resolution characteristic, or
an obstruction condition.

15. A non-transitory computer-readable medium storing instructions, the instructions comprising:
one or more instructions that, when executed by one or more processors, cause the one or more processors to:
generate an artificial image of a machine and an environment;
obtain a synthetic machine model of the machine and associated motion data for the synthetic machine model of the machine based on the artificial image of the machine;
render the synthetic machine model into a synthetic rendered environment associated with a set of characteristics, the synthetic rendered environment obtained based on the artificial image of the environment;
vary a position of the synthetic machine model with respect to the synthetic rendered environment based on the associated motion data;
vary the set of characteristics;
capture a set of images of the synthetic machine model and the synthetic rendered environment based on varying the position of the synthetic machine model and varying the set of characteristics;
determine bounding box data for the set of images of the synthetic machine model and the synthetic rendered environment based on the position of the synthetic machine model within the synthetic rendered environment relative to an image capture orientation within the synthetic rendered environment; and
provide the set of images of the synthetic machine model and the synthetic rendered environment and the bounding box data as a data set for object detection.

16. The non-transitory computer-readable medium of claim 15, wherein the set of images are self-labeled synthetic images.

17. The non-transitory computer-readable medium of claim 15, wherein the one or more instructions, when executed by the one or more processors, further cause the one or more processors to:
alter an image, of the set of images, based on an alteration characteristic to generate an altered image; and
store the altered image.

18. The non-transitory computer-readable medium of claim 17, wherein the alteration characteristic is at least one of:
a lighting condition,
a weather condition,
a background condition,
a machine wear condition,
a resolution characteristic, or
an obstruction condition.

19. The non-transitory computer-readable medium of claim 15, wherein the one or more instructions, when executed by the one or more processors, further cause the one or more processors to:
train a first object detection system based on the data set;
validate an accuracy of the first object detection system;
determine, based on validating the accuracy of the first object detection system, that the first object detection system does not satisfy an accuracy threshold;
generate an additional data set based on determining that the first object detection system does not satisfy the accuracy threshold; and train a second object detection system based on the additional data set.

20. The non-transitory computer-readable medium of claim 15, wherein the one or more instructions, when executed by the one or more processors, further cause the one or more processors to:
train, using the data set, an object detection system using at least one of:
a neural network technique,
an artificial intelligence technique, or
a computer vision technique.

* * * * *